(12) United States Patent
Howard et al.

(10) Patent No.: US 7,243,374 B2
(45) Date of Patent: Jul. 10, 2007

(54) RAPID APPLICATION SECURITY THREAT ANALYSIS

(75) Inventors: Michael Howard, Bellevue, WA (US); Praerit Garg, Kirkland, WA (US); Loren M. Kohnfelder, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 09/927,427

(22) Filed: Aug. 8, 2001

(65) Prior Publication Data

US 2003/0033516 A1    Feb. 13, 2003

(51) Int. Cl.
*G06F 11/30* (2006.01)

(52) U.S. Cl. .......................................... 726/25; 726/23

(58) Field of Classification Search ................ 713/152, 713/200
See application file for complete search history.

(56) References Cited

U.S. PATENT DOCUMENTS

| | | |
|---|---|---|
| 5,031,089 A | 7/1991 | Liu et al. |
| 5,220,621 A | 6/1993 | Saitoh |
| 5,430,810 A | 7/1995 | Saeki |
| 5,475,817 A | 12/1995 | Waldo et al. |
| 5,748,958 A | 5/1998 | Badovinatz et al. |
| 5,768,271 A | 6/1998 | Seid et al. |
| 5,801,970 A | 9/1998 | Rowland et al. |
| 5,826,015 A | 10/1998 | Schmidt |
| 5,845,277 A | 12/1998 | Pfeil et al. |
| 5,872,914 A | 2/1999 | Walker, Jr. et al. |
| 5,895,499 A | 4/1999 | Chu |
| 5,948,055 A | 9/1999 | Pulsipher et al. |
| 5,960,371 A | 9/1999 | Saito et al. |
| 5,968,126 A | 10/1999 | Ekstrom et al. |
| 6,047,325 A | 4/2000 | Jain et al. |
| 6,070,243 A | 5/2000 | See et al. |
| 6,075,776 A | 6/2000 | Tanimoto et al. |
| 6,085,238 A | 7/2000 | Yuasa et al. |
| 6,108,699 A | 8/2000 | Moiin |
| 6,108,702 A | 8/2000 | Wood |
| 6,111,993 A | 8/2000 | Matsunaga |

(Continued)

FOREIGN PATENT DOCUMENTS

EP    0962861 A2    12/1999

(Continued)

OTHER PUBLICATIONS

Nestor, "Security Modelling Using Hierarchical State Machines", IEEE 1991, pp. 110-119.

(Continued)

*Primary Examiner*—Emmanuel L. Moise
*Assistant Examiner*—Tamara Teslovich
(74) *Attorney, Agent, or Firm*—Lee & Hayes, PLLC

(57) ABSTRACT

The following subject matter provides for modeling an application's potential security threats at a logical component level early in the design phase of the application. Specifically, in a computer system, multiple model components are defined to represent respective logical elements of the application. Each model component includes a corresponding set of security threats that could potentially be of import not only to the component but also to the application as a whole in its physical implementation. The model components are interconnected to form a logical model of the application. One or more potential security threats are then analyzed in terms of the model components in the logical model.

41 Claims, 7 Drawing Sheets

U.S. PATENT DOCUMENTS

| | | |
|---|---|---|
| 6,115,393 A | 9/2000 | Engel et al. |
| 6,125,447 A | 9/2000 | Gong |
| 6,141,749 A | 10/2000 | Coss et al. |
| 6,151,688 A | 11/2000 | Wipfel et al. |
| 6,178,529 B1 | 1/2001 | Short et al. |
| 6,192,401 B1 | 2/2001 | Modiri et al. |
| 6,208,345 B1 | 3/2001 | Sheard et al. |
| 6,212,559 B1 | 4/2001 | Bixler et al. |
| 6,230,312 B1 | 5/2001 | Hunt |
| 6,259,448 B1 | 7/2001 | McNally et al. |
| 6,263,089 B1 | 7/2001 | Otsuka et al. |
| 6,266,707 B1 | 7/2001 | Boden et al. |
| 6,311,144 B1 | 10/2001 | Abu El Ata |
| 6,324,571 B1 | 11/2001 | Hacherl |
| 6,336,171 B1 | 1/2002 | Coskrey, IV |
| 6,338,112 B1 | 1/2002 | Wipfel et al. |
| 6,353,898 B1 | 3/2002 | Wipfel et al. |
| 6,360,265 B1 | 3/2002 | Falck et al. |
| 6,366,578 B1 | 4/2002 | Johnson |
| 6,370,573 B1 | 4/2002 | Bowman-Amuah |
| 6,389,464 B1 | 5/2002 | Krishnamurthy et al. |
| 6,393,456 B1 | 5/2002 | Ambler et al. |
| 6,393,474 B1 | 5/2002 | Eichert et al. |
| 6,427,163 B1 | 7/2002 | Arendt et al. |
| 6,449,641 B1 | 9/2002 | Moiin et al. |
| 6,466,932 B1 | 10/2002 | Dennis et al. |
| 6,466,978 B1 | 10/2002 | Mukherjee et al. |
| 6,466,984 B1 | 10/2002 | Naveh et al. |
| 6,470,332 B1 | 10/2002 | Weschler |
| 6,480,955 B1 | 11/2002 | DeKoning et al. |
| 6,484,261 B1 | 11/2002 | Wiegel |
| 6,487,622 B1 | 11/2002 | Coskrey, IV et al. |
| 6,493,715 B1 | 12/2002 | Funk et al. |
| 6,496,187 B1 | 12/2002 | Deering et al. |
| 6,510,154 B1 | 1/2003 | Mayes et al. |
| 6,510,509 B1 | 1/2003 | Chopra et al. |
| 6,519,615 B1 | 2/2003 | Wollrath et al. |
| 6,529,953 B1 | 3/2003 | Van Renesse |
| 6,549,516 B1 | 4/2003 | Albert et al. |
| 6,564,261 B1 | 5/2003 | Gudjonsson et al. |
| 6,570,875 B1 | 5/2003 | Hegde |
| 6,584,499 B1 | 6/2003 | Jantz et al. |
| 6,587,876 B1 | 7/2003 | Mahon et al. |
| 6,598,173 B1 | 7/2003 | Sheikh et al. |
| 6,601,101 B1 | 7/2003 | Lee et al. |
| 6,606,708 B1 | 8/2003 | Devine et al. |
| 6,609,148 B1 | 8/2003 | Salo et al. |
| 6,609,213 B1 | 8/2003 | Nguyen et al. |
| 6,615,256 B1 | 9/2003 | van Ingen et al. |
| 6,631,141 B1 | 10/2003 | Kumar et al. |
| 6,651,101 B1 | 11/2003 | Gai et al. |
| 6,675,308 B1 | 1/2004 | Thomsen |
| 6,681,262 B1 | 1/2004 | Rimmer |
| 6,684,335 B1 | 1/2004 | Epstein, III et al. |
| 6,691,168 B1 | 2/2004 | Bal et al. |
| 6,694,436 B1 | 2/2004 | Audebert |
| 6,717,949 B1 | 4/2004 | Boden et al. |
| 6,718,379 B1 | 4/2004 | Krishna et al. |
| 6,728,885 B1 | 4/2004 | Taylor et al. |
| 6,748,447 B1 | 6/2004 | Basani et al. |
| 6,754,716 B1 | 6/2004 | Sharma et al. |
| 6,769,008 B1 | 7/2004 | Kumar et al. |
| 6,801,528 B2 | 10/2004 | Nassar |
| 6,801,937 B1 | 10/2004 | Novaes et al. |
| 6,804,783 B1 | 10/2004 | Wesinger et al. |
| 6,820,121 B1 | 11/2004 | Callis et al. |
| 6,856,591 B1 | 2/2005 | Ma et al. |
| 6,862,613 B1 | 3/2005 | Kumar et al. |
| 6,904,458 B1 | 6/2005 | Bishop et al. |
| 6,907,395 B1 | 6/2005 | Hunt et al. |
| 6,957,186 B1 | 10/2005 | Guheen et al. |
| 7,027,412 B2 | 4/2006 | Miyamoto et al. |
| 7,054,943 B1 | 5/2006 | Goldszmidt et al. |
| 2001/0019554 A1 | 9/2001 | Nomura et al. |
| 2002/0069369 A1 | 6/2002 | Tremain |
| 2002/0095524 A1 | 7/2002 | Sanghvi et al. |
| 2002/0194369 A1 | 12/2002 | Rawlings et al. |
| 2003/0041139 A1 | 2/2003 | Beadles et al. |
| 2003/0056063 A1 | 3/2003 | Hochmuth et al. |
| 2003/0120763 A1 | 6/2003 | Voilpano |
| 2003/0126230 A1 | 7/2003 | Donatelli et al. |
| 2003/0154404 A1 | 8/2003 | Beadles et al. |
| 2003/0206548 A1 | 11/2003 | Bannai et al. |
| 2004/0054791 A1 | 3/2004 | Chakraborty et al. |
| 2004/0073443 A1* | 4/2004 | Gabrick et al. ............... 705/1 |
| 2004/0078787 A1 | 4/2004 | Borek et al. |
| 2005/0193103 A1 | 9/2005 | Drabik |

FOREIGN PATENT DOCUMENTS

| | | |
|---|---|---|
| EP | 1063815 A2 | 12/2000 |
| WO | WO9963439 | 12/1999 |

OTHER PUBLICATIONS

Shi et al., "An effective Model for Composition of Secure Systems,", The Journal of Systems and Software, 1998, pp. 233-244.

Nerurkar, "Security Analysis & Design", Dr. Dobt's Journal, Nov. 2000, pp. 50-56.

Howard et al., "Designing Secure Web-Based Applications for Microsoft Windows 2000", 2000.

Liu et al., "Visualization in Network Topology Optimization", ACM, 1992, pp. 131-138.

Li et al., "Hardware Design of a 2-D Motion Estimation System Based on the Hough Transform" IEEE 1998 16 pages.

Smith, et al., "Distributed Management of Future Global Multi-Service Networks" British Telecommunications EngineeringLondon GB v. 13 part 3 Oct. 1, 1994 pp. 221-226.

Somers, "Hybrid: Unifying Centralised and Distributed Network Management using Intelligent Agents" IEEE Network Operations and Management Symposium Kyoto Apr. 15-19, 1996. pp. 34-43.

Webster's Seventh New Collegiate Dictionary. G. C. Merriam Co. Copyright 1971 pp. 438 and 767.

Svend Frolund & Pankah Garg, "Design-Time Simulation of a Large-Scale, Distrubuted object System" ACM 1998, pp. 374-400.

* cited by examiner

RAPID APPLICATION SECURITY THREAT ANALYSIS

TECHNICAL FIELD

The following subject matter pertains to designing secure computer program applications.

BACKGROUND

It is no secret that Internet and corporate intranet usage has exploded over the past few years and continues to grow rapidly. People have become very comfortable with many services offered on the World Wide Web (or simply "Web") such as electronic mail, online shopping, gathering news and information, listening to music, viewing video clips, looking for jobs, and so forth. To keep pace with the growing demand for Internet-based services, there has been tremendous growth in Web based computer systems/applications hosting Websites, providing backend services for those sites, and storing data associated with those sites.

As Internet and intranet usage continues to grow, so does the number and severity of security-related attacks on applications such as those that operate over the Internet and intranets. Public interest in security centered on privacy as it relates to financial transactions and identity protection, and the rapid spread of computer viruses compromising data integrity, has increased pressure to make these applications and operating systems for executing these applications more secure.

Today, application developers typically see the development of any security aspects of an application as an afterthought. Perhaps this is because the networking industries have grown so fast that everyone's focus has been simply to keep up with the exploding demand by building additional applications. In this environment, security is generally considered to be technology that has no business value, but rather, considered to be technology that enables business processes. (E.g., adding open database connectivity (ODBC) to a computer program in itself adds no value to a business, but applications using ODBC do provide business value). Thus, developers often consider adding security features to computer program applications as unnecessary work that offers no significant financial return. Consequently, not much thought has gone into how to model security into distributed applications.

At best, security features are generally retrofitted into an application after all of the business value functionality has been completed or at least substantially completed. The downside with such traditional procedures to retrofit application security is that such solutions typically result in ad-hoc security solutions that are not only difficult to integrate into an application's framework, but that also may not be adequately integrated into the framework to mitigate substantially all of the real security threats to which the application may be exposed.

Accordingly, the following subject matter addresses these and other problems of conventional techniques to provide security to computer program applications only after the fundamental design and implementation of the computer program application has already taken place.

SUMMARY

The following subject matter provides for modeling an application's potential security threats at a logical component level early in the design phase of the application. Specifically, in a computer system, multiple model components are defined to represent respective logical elements of the application. Each model component includes a corresponding set of security threats that could potentially be of import not only to the component but also to the application as a whole in its physical implementation. The model components are interconnected to form a logical model of the application. One or more potential security threats are then analyzed in terms of the model components in the logical model.

DETAILED DESCRIPTION

Figure 1:
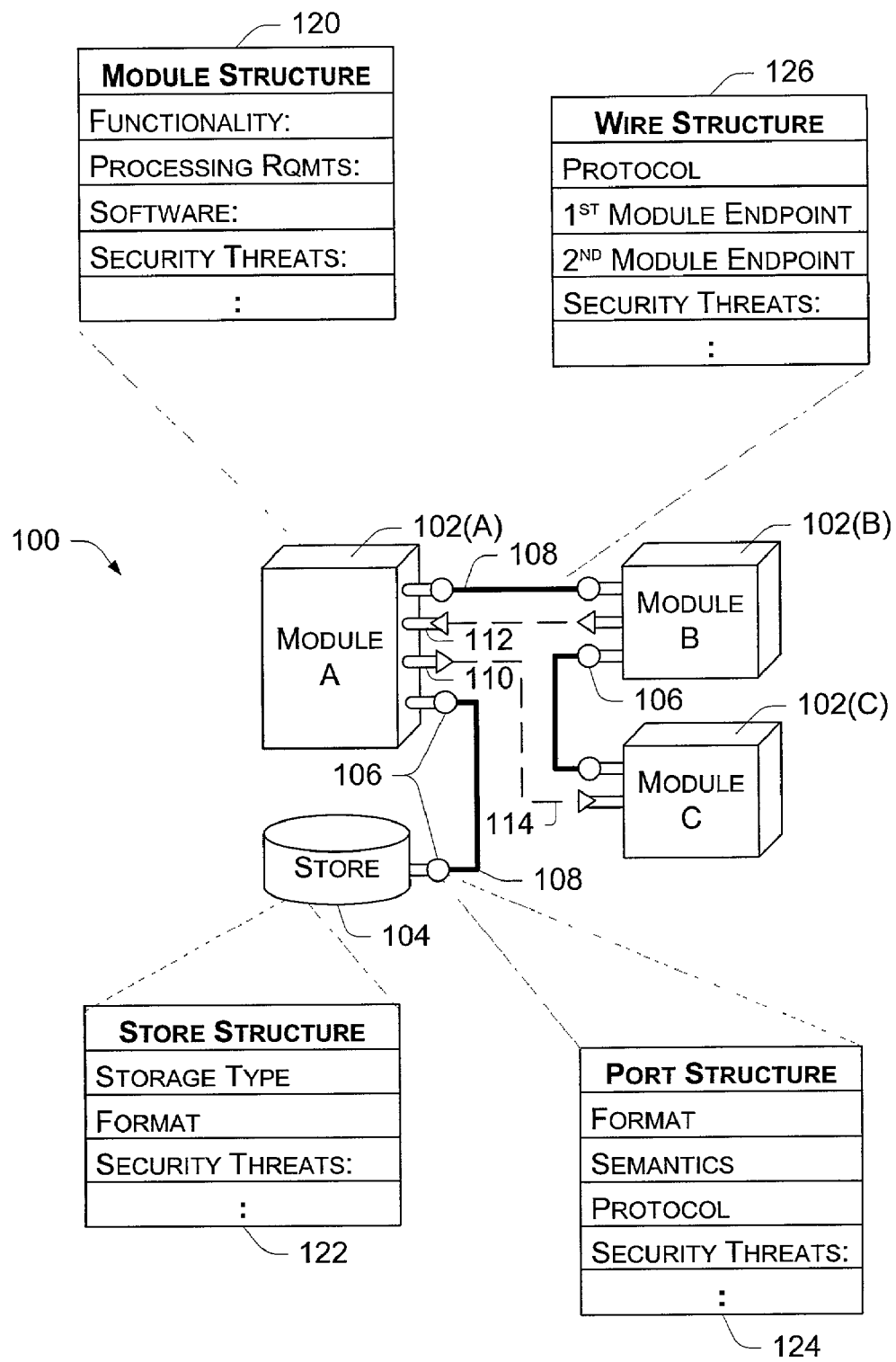
FIG. 1 illustrates model components that form the logical building blocks for modeling security into an application, along with the associated schema.

Designing an application before actually implementing it is an extremely important and well-accepted engineering process. Application design typically involves modeling each structural and software component of an application in an abstract manner, determining each component's corresponding function(s), identifying the interfaces between the components, and indicating the data flows between the components over the interfaces.

As discussed above, traditional application modeling procedures do not typically incorporate security into an application in the application's early design phase. In contrast to such traditional procedures, the following described subject matter provides for specifying an application's security threats early in the application's design. This provides a significant advantage over traditional procedures that attempt to retrofit security threat mitigation into existing applications. It is far simpler to add a security component to an application in the early stages of its development than it is to add security to an application that was designed without security in mind.

Security Threats

Security is typically considered to include the following categories: authentication, authorization, auditing, privacy, integrity, availability, and non-repudiation. Each of these categories should be taken into consideration in the early stages of designing the configuration and operation of an application. Authentication is a process by which an entity, also called a principal, verifies that another entity is who or what it claims to be. The principal can be a user, executable code, or a computer that requires evidence in the form of credentials to authenticate the entity. Standard authentication technologies include, for instance, Kerberos, WINDOWS NTLM®, Basic, and Digest. Each technology has its particular strengths and weaknesses.

For example, Basic authentication is insecure because it does not encrypt passwords and tools to "sniff" passwords off of the network are in common use by systems crackers. Thus, applications that send an unencrypted password over the network are extremely vulnerable. In contrast, Kerberos authentication is designed to provide strong authentication for client/server applications by using secret-key cryptography.

Once a principal's identity is authenticated, the principal will typically want to access resources such as printers, files, registry keys, etc. The authorization security category deals with the availability of the principal's access to such resources. Access is determined by performing an access check to see if the authenticated entity has access to the resource being requested. Examples of standard authorization mechanisms include: WINDOWS 2000 access control lists (ACLs), WINDOWS 2000 privileges, permissions (e.g., create, read, write, etc.), and administrator defined role checking in a Common Object Model (COM+) component.

The auditing security category is directed to the collection of information about successful and failed access to objects, uses of privileges, and other security actions. This information is generally collected for later analysis. Standard examples of audit logs include, the WINDOWS 2000 Security Event Log, the SQL Server Log, and the Internet Information Services 5 Log.

Privacy, or confidentiality is directed to hiding information from other entities and is typically performed using encryption. Standard examples of privacy technology include: Secure Sockets Layer (SSL) or Transport Layer Security (TSL), and Internet Protocol security (IPSec).

Integrity refers to the ability to protect data from being deleted or changed either maliciously or by accident. Examples of standard integrity technology include SSL/TLS (both use Message Authentication Code (MAC) algorithms to verify that data is not tampered with) and IPSec (provides low level checking of IP packets).

The availability security category is directed to ensuring that a legitimate entity is not denied access to a requested resource. Examples of standard availability technology include: load balancing hardware and software to spread loads across resources, and failover hardware and software to provide redundancy to an application.

The non-repudiation security category is directed to providing proof that a particular action occurred so as to prevent a principal from denying the occurrence of the particular action. A complete non-repudiation plan calls for aspects of authentication, authorization, auditing and data integrity.

Proper application security involves not only consideration of the security categories discussed above, but also requires that the identified security threats (e.g., privacy, data integrity, etc.) be analyzed from the perspective of the particular environment in which the application will operate such as on a corporate intranet or on the Web. Once the particular environment is determined, the application developer decides whether to counter the threats with specific technology, and/or policy and procedure.

A Modeling System to Specify an Application's Security Threats

To identify an application's security threats the modeling system defines a number of model components that form the building blocks of a logical model of an application: a module, a port, and a wire. It also defines a set of model extensions including, but not limited to: a store, an event source, an event sink, and an event path. In an application design tool, the components are represented pictorially on a user interface (UI) as graphical elements or symbols that may be arranged and interconnected to create logical models of distributed applications such as a Website and/or intranet based application. The graphical elements have functional operations that are dictated by the graphical elements that are specified.

FIG. 1 illustrates a set of model components 100 that a module, as represented by modules 102(A) through 102(C), a store 104, ports 106, wires 108, event sources 110, event sinks 112, and event paths 114. The components 100 are arranged in no particular manner other than to foster discussion of their individual traits.

A module 102 represents a basic unit of functionality for the application and is depicted as a block. It is a logical entity that represents some portion of an application, but has no physical manifestation. The module often corresponds to a software program that handles a logical set of tasks for the application. For instance, one module might represent a front-end for a Website, another module might represent a login database, another module might represent an electronic mail program, and another module might represent a security technology (e.g., Kerberos authentication, SSL/TLS, IPSec, etc.).

Each module 102 is a container of behavior. A simple module is atomic and has associated a unique identifier. Modules can be nested into a hierarchy of modules to form more complex behaviors. In a module hierarchy, the leaf modules are simple modules, and the non-leaf modules are compound modules.

Each module 102 defines a unit of scaling. While one module logically represents a functional operation of the application, the module may translate to any number of computers when actually implemented. When converted to a physical implementation, "instances" are created from the modules. The module instances are assigned a unique identifier and maintain ancestral data regarding which module created them. The instances of modules correspond to software programs that run on individual computer nodes.

A store 104 is the most basic unit of storage and is depicted graphically as a disk storage icon. It represents a logical partitioning, which may be implemented by any number of physical disks or other storage media that is coupled to a computer such as volatile memory (e.g., RAM), and non-volatile memory (e.g., ROM, Flash memory, a hard disk, optical disk, Redundant Array of Independent Disk (RAID) memory, etc.).

A port 106 is a service access point for a module 102 or store 104 and is depicted as spherical knobs projecting from the module or store. All service-related communications into and out of the module go through the port 106. Each port 106 has a "type", which is a set of attributes describing format, semantics, protocol, and so forth. At runtime, the port represents a set of physical ports associated with the instantiated modules.

A wire 108 is the logical binding that defines a communication route between two ports 106 and is depicted as a bold line. Each wire 108 can be type-checked (i.e., protocols, roles) and defines protocol configuration constraints (e.g., HTTP requires TCP, TCP requires IP, etc.).

Event sources 110 and event sinks 112 are used for discrete semantic messaging between modules and stores. An event source 110 is pictorially shown as a triangle pointing away from the module or store, while an event sink 112 is depicted as a triangle pointing toward the module or store. An event path 114 is a logical connection between sources and sinks, and carries event/interrupt messages used to inform modules/stores. It is depicted as a dashed line.

FIG. 1 also illustrates aspects of the underlying the graphical elements as exemplary data structures associated with the model components. Module 102(A) has an associated structure 120 that contains various attributes/characteristics for the module, such as functionality, processing requirements, software, potential security threat categories (e.g., authentication, authorization, integrity, etc.), and so forth. Thus, a module for a database server function might have characteristics pertaining to the kind of database (e.g., relational), the data structure (e.g., tables, relationships), software (e.g., SQL), software version, security threat categories of authentication, authorization, data integrity, privacy, and so forth. Modules 102(B) and 102(C) have similar structures (not shown).

The store 104 has a corresponding structure 122 that defines the requirements for storage. The store structure 122 might include, for example, the kind of storage (e.g., disk), the storage format, security threats (e.g., privacy), and so on. Each port 106 has a structure, as represented by structure 124, which dictates the port's type, security threats (e.g., data integrity, authentication, authorization, etc.). Each wire 108 also is also associated with a structure, such as structure 126, which outlines the protocols implemented by the connection, (e.g., TCP/IP, SOAP, etc.), module endpoints indications (e.g., port numbers), and security threat categories (e.g., privacy and data integrity).

Similar structures may also be provided for event sources, event sinks, and paths.

The particular security threats associated with any one model component will depend the function of that component. For example, the security threats that apply to a data store 104 or a wire 108 may include only a subset of the threats that apply to a module 102 that coordinates money transfers between entities. Thus, a data store or wire may indicate, for example, that there are possible threats to data privacy and a threat to data integrity. Whereas, a module may indicate, for example, a threat list including authentication, authorization, integrity, non-repudiation, privacy, and so forth.

An understanding of business/product requirements and knowledge of the data that is needed to support those business requirements can only determine the particular threat(s) and threat mitigating technologies that will be meaningful to any one particular application. However, an underlying modeling schema (i.e., the component database 518 of FIG. 5) assists application developers in specifying the particular threats that will be meaningful to any one component and the system as a whole in view of those requirements.

Using the model components, an application developer can logically configure applications prior to implementing them. The developer drafts a model to select and interconnect the model components such as those shown in FIG. 1. As each component is added to the model, the modeling software (i.e., the modeling system 612 of FIG. 6) analyzes the component with respect to its interconnections to determine the security threats that apply to the component and its interconnections. The developer selects (e.g., from a drop down menu displayed in response to a mouse click on a particular component) those threats that are significant to each model component. (The selected security threats may subsequently be converted into a physical program code that implements a substantially optimal solution to mitigate the determined threat(s) for the component, and/or interconnection). Thus, the application developer after identifying potential security threats decides whether to counter the identified threats.

By selecting those threats that are significant to each model component, the potential threats to other components in the system may change. For example, specifying, or addressing an authenticated identity requirement at one component, or node might (or might not) address a potential threat at a different node elsewhere in the system. To address the dynamic flow and/or ebb of threats during the application design process, the modeling software provides tools for a developer to analyze selected threats (from a component-centric viewpoint or from a system level viewpoint) with respect to each other potential and/or countered (or addressed) threat in the system. These tools are described in greater detail below in reference to FIGS. 3-5.

The modeling system allows application developers to focus not only on designing software for a specific functional task (e.g., front-end, login database, email program, etc.), but also allows the developer, while still in the early design of the application, to address any security threats to the application in terms of the components that comprise the logical model of the application.

An Exemplary Logical Model of an Application

Figure 2:
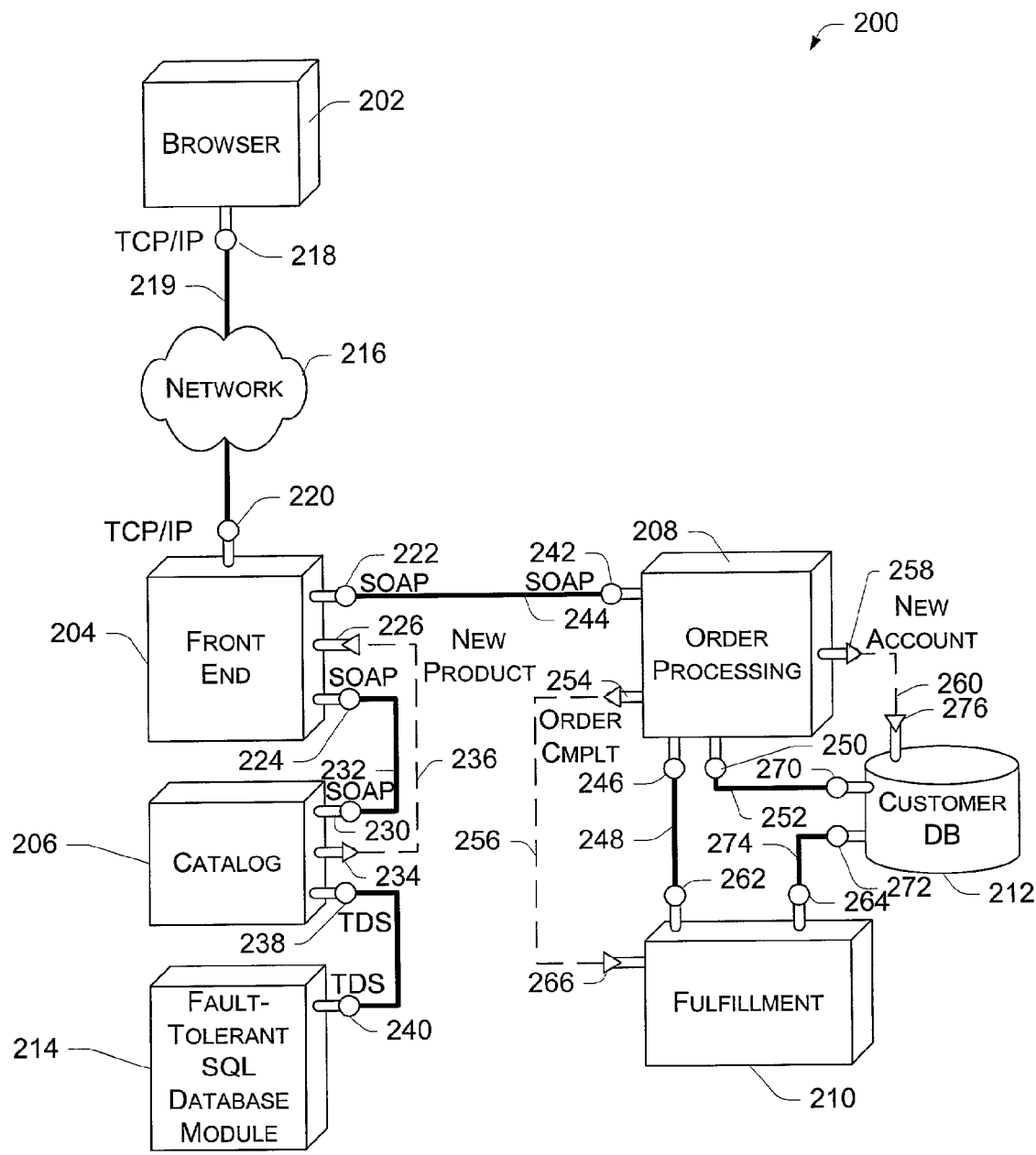
FIG. 2 illustrates an online retailer application for a distributed application that is modeled in terms of its logical components.

FIG. 2 shows a simplified application 200 for an online retailer. The application 200 includes a web browser 202, a front-end module 204, a catalog module 206, an order-processing module 208, and a fulfillment module 210. The application 200 also includes a customer database 212 and a fault-tolerant SQL database module 214.

Clients who wish to shop with the online retailer use the web browser 202 to communicate with the front-end module 204 across the network 216 (e.g., the Internet, an intranet, etc.). The web browser has a port 218 that accommodates communications with the online retailer using the TCP/IP protocol over the network. The front-end module 204 handles requests from clients who wish to shop with the online retailer. The front-end module 204 has a port 220 that accommodates communications with external clients using the TCP/IP protocol over the network 216. The front-end module 204 also has an order port 222 to define a communication exchange with the order-processing module 208 and a catalog port 224 for communication flow to the catalog module 206. The ports 222 and 224 may be configured according to any of a variety of types, which support any one of a number of protocols including SOAP, TCP, or UDP. An event sink 226 is also provided to receive a "new product" message from the catalog module 206 when a new product has been added to the catalog.

The catalog module 206 provides catalog information that may be served by the front-end to the requesting clients. The catalog module 206 has a front-end port 230 connected via a wire 232 to the catalog port 224 of the front-end module 204. The front-end port 224 has a type that matches the catalog port 230. The catalog module 206 also has an event source 234 for communicating the "new product" messages over path 236 to the event sink 226 of the front-end module 204.

A SQL port 238 interfaces the catalog module 206 with the SQL database module 214. The SQL port 238 has a type that utilizes the TDS protocol for the communication exchange with the external port 240 of the SQL database 214.

The order-processing module 208 has a front-end port 242 to define a communication interface with the front-end module 204 via a wire 244. The order-processing module 208 also has a fulfillment port 246 to facilitate communication with the fulfillment module 210 over wire 248 and a database port 250 to facilitate communication with the customer database 212 via wire 252.

An event source 254 is provided at the order-processing module 208 to pass "order complete" events to the fulfillment module 210 via path 256. These events inform the fulfillment module 210 that an order is complete and ready to be filled. A second event source 258 passes "new account" events to the customer database 212 via path 260 whenever a new customer orders a product.

The fulfillment module 210 has an order port 262 to provide access to the wire 248 to the order-processing module 208 and a database port 264 to interface with the customer database 212. The fulfillment module 208 also has an event sink 266 to receive the "order complete" events from the order-processing module 210.

The customer database 212 has an order port 270 to provide access to wire 250 and a fulfillment port 272 to facilitate communication with the fulfillment module 210 via wire 274. The customer database 212 further has an event sink 276 to receive the "new account" events from the order-processing module 208.

Figure 3:
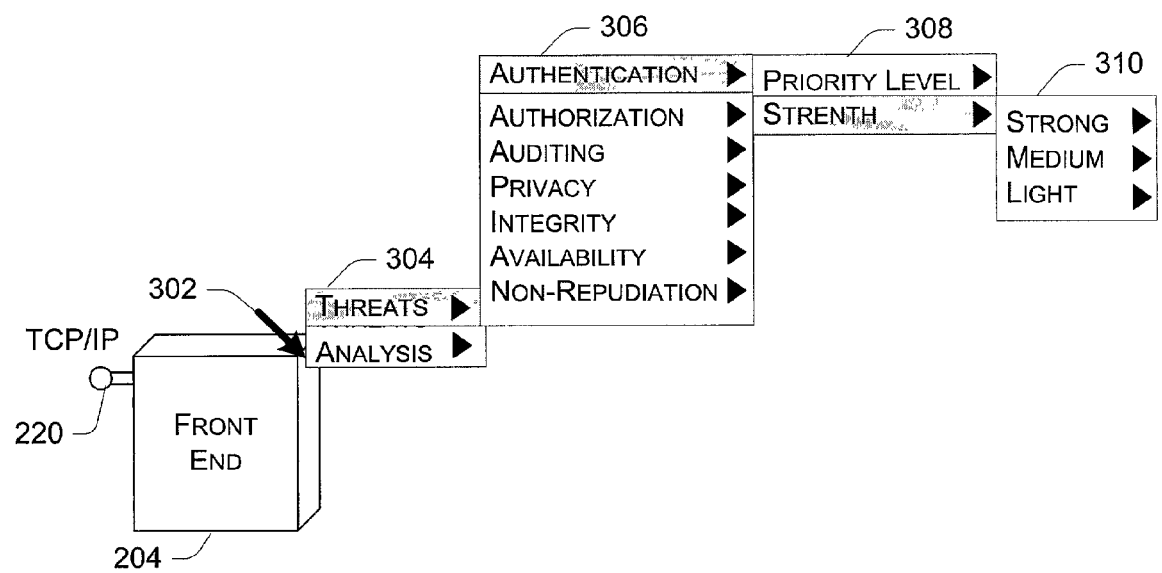
FIG. 3 shows security threat context menu items that correspond to a selected a front-end component of a logically modeled application.

FIG. 3 shows exemplary threat analysis menu items that correspond to a model component of the order-processing application of FIG. 2. In this example, the component is the front-end module 204 of FIG. 2. However, the component could also have been a different component such as a different module, a wire, a port, and so on. Cursor 302 indicates that a developer has selected the front-end module, resulting in the display of the context-sensitive menu 304, which includes a "threat" menu item and an "analysis" menu item.

The threat menu item allows the developer to specify (e.g., assign or counter) potential threats (e.g., threats identified in the submenu 306) to the selected module. The highlighted portion (i.e., the gray portion) of the menu 304 indicates that the "threats" menu item has been selected, causing submenu 306 to be displayed. The highlighted area of submenu 306 indicates that the entity access authentication menu item has been selected, which in turn causes the submenu 308 to be displayed. Submenu 308 allows the developer to allocate a priority to the selected threat (e.g., 0-5, where 0 is the lowest priority and 5 is the highest priority). Submenu 308 also includes a "strength" submenu item that allows for selection the a particular level of strength desired to mitigate the threat. For instance, a developer can indicate that strong authentication is desired (e.g. Kerberos), that weak authentication is desired (e.g. Basic), and so on.

Figure 4:
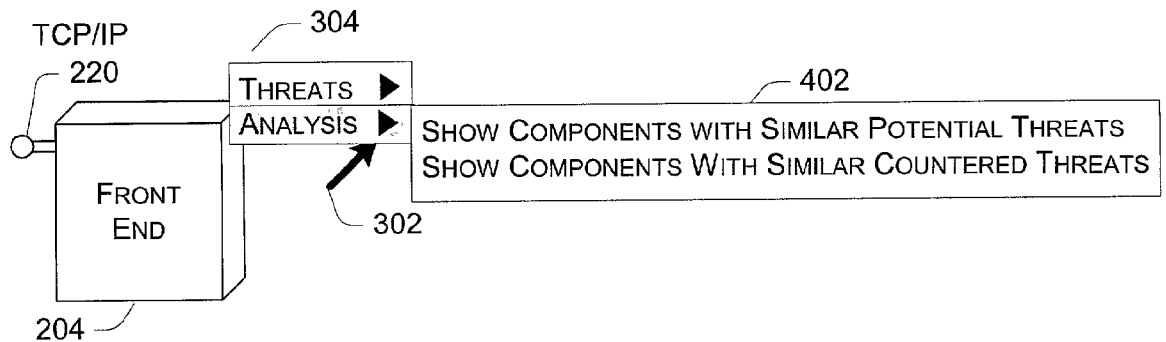
FIG. 4 shows security analysis context menu items corresponding to a selected a front-end component of a logically modeled application.

FIG. 4 shows security threat "analysis" submenu items of menu 304 for analyzing the security threats of a logical system. Specifically, threat analysis submenu items 402 respectively provide for indicating: (a) for a selected component, each other component in the system (if any) that has a one or more of the same potential security threats as the selected component; and, (b) any other component in the system that has one or more of the same countered threats as compared to the selected component.

A potential threat indicates each of the threats that should be considered when designing a system that includes the model component. (A component database schema 618 of FIG. 6 defines each of the potential threats that correspond to a model component). A countered threat includes those threats of the potential threats that a developer has decided to address at a model component. In this manner, a developer can analyze the flow of security throughout a system to identify how a particular threat mitigating implementation at one component might address a potential threat at another component in the system.

Figure 5:
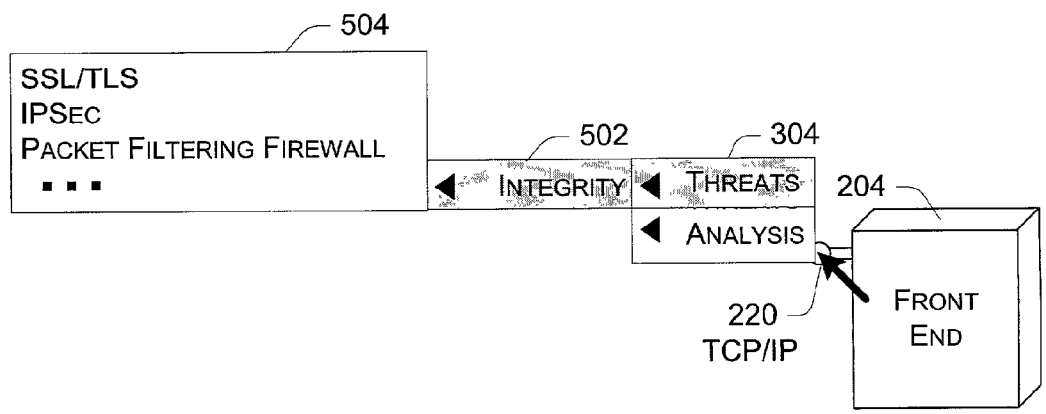
FIG. 5 shows security threat context menu items corresponding to a selected a TCP/IP port of a logically modeled application.

FIG. 5 shows that a developer has selected the TCP/IP port 220 of the application 200. Port 220 is used by the online ordering system 200 to receive information from a client across a network. The modeling system displays submenu 502, which identifies a potential packet integrity security threat should be considered when designing the module. Submenu 504 shows specific technologies that can be used in the physical implementation of the application to mitigate the identified security threat.

The modeling approach illustrated in FIGS. 1-5 is tremendously beneficial for a number of reasons. First, the modeling approach is beneficial because it allows developers to model, analyze, and specify security related aspects of an application's design in terms of abstract functional pieces. Second, the modeling approach is beneficial because it allows the application developer to decide whether to counter similar threats at one or more of the model components to substantially optimally integrate security into the application.

For instance, developers of the online retailer application 200 of FIG. 2 may determine: (a) that the browser 202 module requires authentication; (b) that the port 220 for receiving outside communications for the front-end 204 unit requires a packet filtering firewall to stop certain types of packets from entering into the online retailer's domain; (c) that all of the other modules in the application require auditing technologies; (d) that the database requires a privacy based technology; and (e) that the order-processing unit and fulfillment units both require non-repudiation technology as well as authentication.

The above example is now used to illustrate use of the "analysis" submenu item of menu 304 of FIG. 5. Upon selection of order-processing unit 208 (see, FIG. 2) and subsequent selection of the "show components with same actual threats" submenu item, the fulfillment unit 210 and the browser 202 are highlighted on a display (or otherwise identified with a message or dialog box) to show that they require at least a subset of the actual threats required by the order-processing unit. (The fulfillment unit requires both non-repudiation technology and authentication. The browser requires only authentication, which is a subset of the order-processing unit's requirements.)

Computer-Based Modeling System and Method

Figure 6:
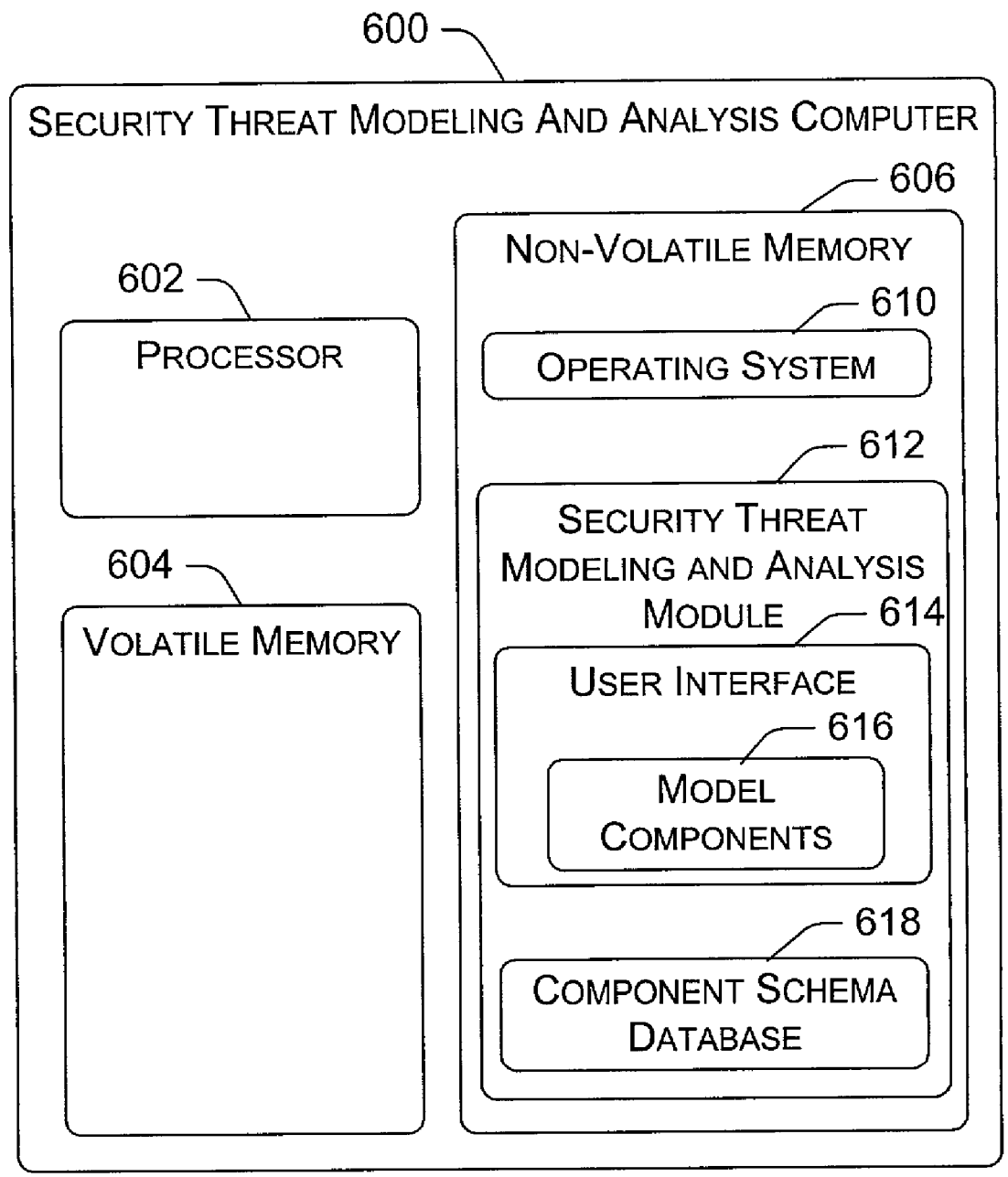
FIG. 6 shows an exemplary computer system that implements security threat-modeling and analysis software used to design security into an application.

FIG. 6 shows an exemplary computer system 600 that implements security threat-modeling software used to design applications. The modeling computer may be implemented as one of the nodes in a Website, an organizational intranet, or other network such as a Local Area Network (LAN), or as a separate computer not included as one of the nodes. The modeling computer has a processor 602, volatile memory 604 (e.g., RAM), and non-volatile memory 606 (e.g., ROM, Flash, hard disk, optical, RAID memory, etc.). The modeling computer 600 runs an operating system 610 and a security threat and analysis application-modeling module 612.

For purposes of illustration, operating system 610 and modeling module 612 are illustrated as discrete blocks stored in the non-volatile memory 606, although it is recognized that such programs and components reside at various times in different storage components of the computer 600 and are executed by the processor 602. Generally, these software components are stored in non-volatile memory 606 and from there, are loaded at least partially into the volatile main memory 604 for execution on the processor 602.

The modeling system 612 includes a UI 614 (e.g., a graphical UI) that presents the pictorial icons of the model components 616 (e.g., modules, ports, sources, sinks, etc.), and a component schema 618. The modeling system 612 allows a developer to design security into an application by defining model components 616 such as modules, ports, and event message schemes along with corresponding integrated security threat analysis information.

The model component database 618 (i.e., a schema) provides class definitions for any number of generic and more specific types of model components. For instance, the schema may include a database class having attributes pertaining to: the type of database (e.g., relational); the data structure (e.g., tables, relationships); software (e.g., SQL); software version; and, security threats—both potential threats and countered threats (e.g., data integrity, privacy, authentication, authorization, availability, and so on).

The UI 614 presents symbols of the components 616, such as the symbols shown in FIGS. 1-3, and permits the developer to arrange and interconnect them. The UI 614 may even support conventional UI techniques as drag-and-drop operations. The symbols depicted on the screen represent model components defined by the underlying component database 618. Thus, a developer can select respective components from the UI that have attributes corresponding to the components function in the application. In this manner, the modeling system 600 changes an application's security threat mitigation development efforts from an ad-hoc retrofit approach to an approach that provides for architecting applications with integrated security threat analysis information early in the design process.

Figure 7:
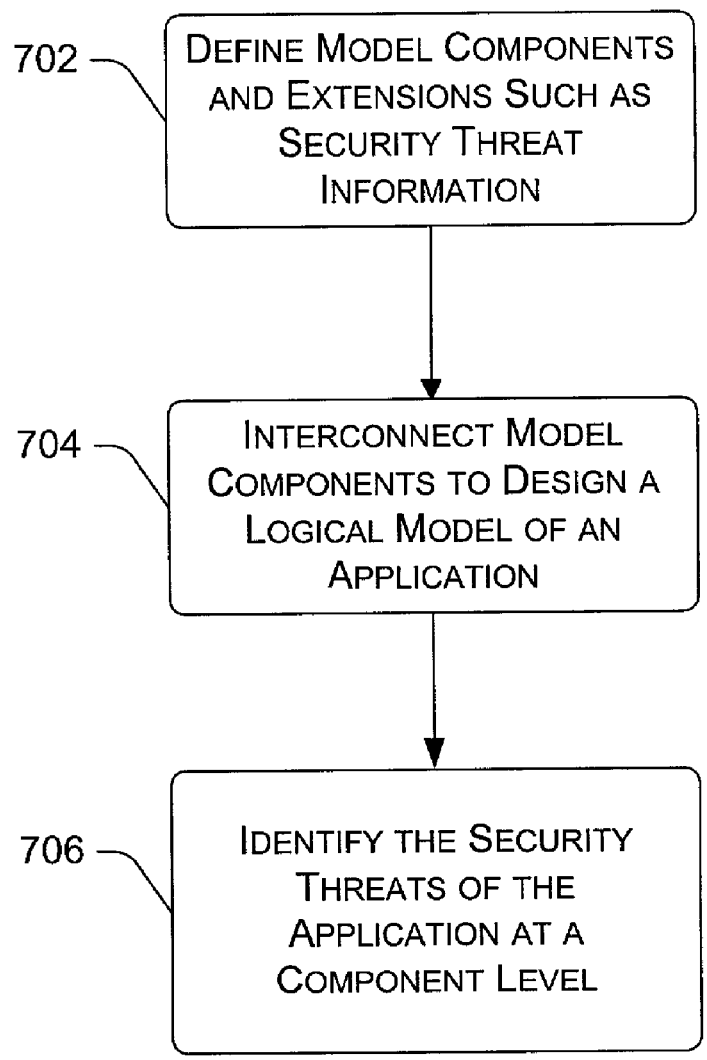
FIG. 7 shows a method for rapidly modeling an application with integrated threat analysis information.

FIG. 7 shows a method for modeling an application with integrated threat analysis information. The method 700 may be implemented, for example, by the modeling module 612 of FIG. 6 executing on the modeling computer 600. In such an implementation, the method is implemented in software that, when executed on computer 600, performs the operations illustrated as blocks in FIG. 7.

At block 702, the modeling module 612 provides for the definition of the model components that form functional elements of an application. The UI 614 enables the developer to create modules, store, ports, wires, and the like, and to define their characteristics (e.g., corresponding security threats). This entry process begins to construct the logical building blocks of the application.

At block 704, the developer uses the modeling system 612 to interconnect the defined model components. By joining the various model components, the developer effectively forms a logical representation of the application.

At block 706, the developer uses the modeling system 612 to identify which, if any, of the potential security threats indicated by each respective model component are significant (i.e., threats that should be countered) to the application's design. This indication can include the assignment of a priority to each identified security threat, the identification of a particular level of threat mitigation to be implemented at the physical level, and even the specification of a specific threat mitigation technology to address the identified threat For instance, the developer may select WINDOWS 2000 privileges technology to address an elevation of privilege threat, SSL/TLS to address a data integrity threat, and so on.

Exemplary Computing Environment

Figure 8:
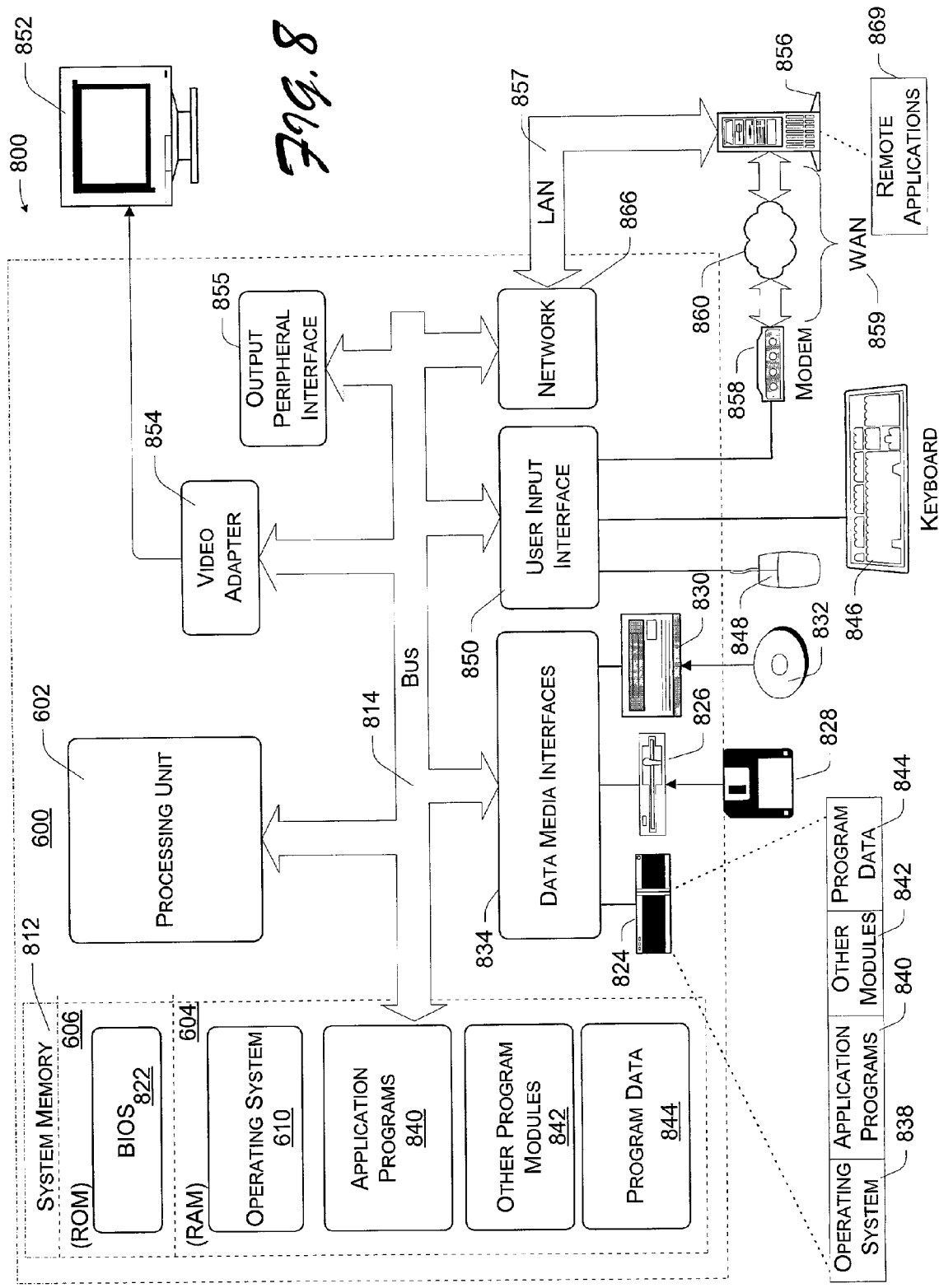
FIG. 8 illustrates an exemplary computing environment on which an exemplary rapid security threat-modeling computer of FIG. 6 may be implemented.

FIG. 8 illustrates an example of a suitable computing environment 800 on which an exemplary application security threat-modeling computer 600 of FIG. 6 may be implemented. The exemplary computing environment is only one example of a suitable computing environment and is not intended to suggest any limitation as to the scope of use or functionality of the exemplary application security threat-modeling computer. Neither should the computing environment 800 be interpreted as having any dependency or requirement relating to any one or combination of components illustrated in the exemplary computing environment 800.

The exemplary application security threat-modeling computer 600 is operational with numerous other general purpose or special purpose computing system environments or configurations. Examples of well known computing systems, environments, and/or configurations that may be suitable for use with an exemplary application security threat-modeling computer include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

An exemplary application security threat-modeling computer 600 may be described in the general context of computer-executable instructions, such as program modules, being executed by a computer. Generally, program modules include routines, programs, objects, components, data structures, etc. that perform particular tasks or implement particular abstract data types. An exemplary application security threat-modeling computer may also be practiced in distributed computing environments where tasks are performed by remote processing devices that are linked through a communications network. In a distributed computing environment, program modules may be located in both local and remote computer storage media including memory storage devices.

As shown in FIG. 8, the computing environment 800 includes a general-purpose computing device in the form of a computer 600. The components of computer 600 may include, by are not limited to, one or more processors or processing units 602, a system memory 812, and a bus 814 that couples various system components including the system memory 812 to the processor 602.

Bus 814 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 600 typically includes a variety of computer readable media. Such media may be any available media that is accessible by computer 600, and it includes both volatile and non-volatile media, removable and non-removable media.

In FIG. 8, the system memory includes computer readable media in the form of volatile memory 604, such as random access memory (RAM) 604, and/or non-volatile memory 606, such as read only memory (ROM). A basic input/output system (BIOS) 822, containing the basic routines that help to transfer information between elements within computer 600, such as during start-up, is stored in ROM 606. RAM typically contains data and/or program modules that are immediately accessible to and/or presently be operated on by processor 602.

Computer 600 may further include other removable/non-removable, volatile/non-volatile computer storage media. By way of example only, FIG. 8 illustrates a hard disk drive 824 for reading from and writing to a non-removable, non-volatile magnetic media (not shown and typically called a "hard drive"), a magnetic disk drive 826 for reading from and writing to a removable, non-volatile magnetic disk 828 (e.g., a "floppy disk"), and an optical disk drive 830 for reading from or writing to a removable, non-volatile optical disk 832 such as a CD-ROM, DVD-ROM or other optical media. The hard disk drive 824, magnetic disk drive 826, and optical disk drive 830 are each connected to bus 814 by one or more interfaces 834.

The drives and their associated computer-readable media provide nonvolatile storage of computer readable instructions, data structures, program modules, and other data for computer 600. Although the exemplary environment described herein employs a hard disk, a removable magnetic disk 828 and a removable optical disk 832, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 828, optical disk 832, ROM 606, or RAM 604, including, by way of example, and not limitation, an operating system 610, one or more application programs 840 such as the rapid security threat analysis and application modeling module 612 of FIG. 6, other program modules 842, and program data 844 (e.g., the component schema database 618).

Each of such operating system 610, one or more application programs 840, other program modules 842, and program data 844 (or some combination thereof) may include an implementation of an exemplary application security threat-modeling computer 600. More specifically, each may include an implementation of an application security threat-modeling computer for modeling an application's potential security threats at a logical component level early in the application's design.

A user may enter commands and information into computer 600 through input devices such as keyboard 846 and pointing device 848 (such as a "mouse"). Other input devices (not shown) may include a microphone, joystick, game pad, satellite dish, serial port, scanner, or the like. These and other input devices are connected to the processing unit 602 through a user input interface 850 that is coupled to bus 814, but may be connected by other interface and bus structures, such as a parallel port, game port, or a universal serial bus (USB).

A monitor 852 or other type of display device is also connected to bus 814 via an interface, such as a video adapter 854. In addition to the monitor, personal computers typically include other peripheral output devices (not shown), such as speakers and printers, which may be connected through output peripheral interface 855.

Computer 600 may operate in a networked environment using logical connections to one or more remote computers, such as a remote server/computer 862. Remote computer 862 may include many or all of the elements and features described herein relative to computer 600.

Logical connections shown in FIG. 8 are a local area network (LAN) 857 and a general wide area network (WAN) 859. Such networking environments are commonplace in offices, enterprise-wide computer networks, intranets, and the Internet.

When used in a LAN networking environment, the computer 600 is connected to LAN 857 via network interface or adapter 866. When used in a WAN networking environment, the computer typically includes a modem 858 or other means for establishing communications over the WAN 859. The modem, which may be internal or external, may be connected to the system bus 814 via the user input interface 850 or other appropriate mechanism.

Depicted in FIG. 8, is a specific implementation of a WAN via the Internet. Computer 600 typically includes a modem 858 or other means for establishing communications over the Internet 860. Modem, which may be internal or external, is connected to bus 814 via interface 850.

In a networked environment, program modules depicted relative to the personal computer 600, or portions thereof, may be stored in a remote memory storage device. By way of example, and not limitation, FIG. 8 illustrates remote application programs 869 as residing on a memory device of remote computer 862. It will be appreciated that the network connections shown and described are exemplary and other means of establishing a communications link between the computers may be used.

Computer-Executable Instructions

An implementation of an exemplary application security threat-modeling computer 600 of FIGS. 6 and 8 may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

Computer Readable Media

An implementation of an exemplary application security threat-modeling computer 600 of FIGS. 6 and 8 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer-implemented method for a computer-program module to provide application security threat-modeling, the method comprising:
   responsive to a first user input, selecting a set of model components to represent respective elements of an application;
   providing class definitions for the model components, each class definition specifying a set of security threats associated with the model component;
   responsive to a second user input, interconnecting at least a subset of the model components to form a logical model of the application;
   responsive to a third user input, selecting a particular component of the subset;
   automatically analyzing the at least a subset of the model components to identify model components of the subset having a security threat associated with a similar security threat category as one of the security threats associated with the particular component; and
   changing a manner in which the components are displayed to a user in response to the selection of the particular component and the analysis.

2. The method of claim 1, wherein the model components comprise a module, a port, a store, or a wire.

3. The method of claim 1, wherein the security threats comprise at least one subset of authentication, authorization, auditing, privacy, integrity, availability, and non-repudiation.

4. The method of claim 1, wherein providing the class definitions further comprises determining the security threats based on functionality of the component with respect to the application.

5. The method of claim 1, wherein the security threats associated with the particular component are potential security threats.

6. The method of claim 1, wherein at least one of the security threats associated with the particular component is a countered security threat.

7. The method of claim 1, wherein analyzing further comprises providing for selection of a particular threat to indicate that the particular threat requires a threat mitigating implementation in the particular component.

8. The method of claim 7, wherein providing for selection of the particular threat further comprises identifying a priority of the threat mitigating implementation.

9. The method of claim 7, wherein providing for selection of the particular threat further comprises identifying a desired level of strength of technology with which to mitigate the particular threat.

10. The method of claim 7, wherein providing for selection of the particular threat further comprises presenting information associated with a particular technology with which to mitigate the one or more security threats in a physical implementation of the application.

11. A computer-readable medium comprising computer-executable instructions for providing application security threat-modeling, the computer-executable instructions comprising instructions for:
    defining a plurality of model components to represent respective elements of an application, each model component specifying a set of security threats associated with the component, the model components being defined with class definitions in a component schema, and the model components being selected in response to a first user input;
    interconnecting, responsive to a second user input, at least a subset of the model components to form a logical model of the application;
    selecting, responsive to a third user input, a particular component of the subset;
    analyzing the at least a subset and respective interconnections to identify model components of the subset having a security threat associated with a similar threat category as one of the security threats associated with the particular component; and
    changing a manner in which the components are displayed to a user in response to the selection of the particular component and the analysis.

12. The computer-readable medium of claim 11, wherein the model components comprise a module, a port, a store, or a wire.

13. The computer-readable medium of claim 11, wherein the security threats comprise at least one subset of authentication, authorization, auditing, privacy, integrity, availability, and non-repudiation.

14. The computer-readable medium of claim 11, wherein the security threats are potential security threats and wherein the computer-executable instructions for defining the model components further comprise instructions for determining the potential security threats for a component of the model components based on functionality of the component in the application.

15. The computer-readable medium of claim 11, wherein the security threats associated with the particular component are potential security threats.

16. The computer-readable medium of claim 11, wherein at least one of the security threats associated with the particular component is a countered security threat.

17. The computer-readable medium of claim 11, wherein the computer-executable instructions for analyzing further comprise instructions for providing for selection of a particular threat to indicate that the particular threat requires a threat mitigating implementation in the particular component.

18. The computer-readable medium of claim 17, wherein the computer-executable instructions for providing for selection of the particular threat further comprise instructions for identifying a priority that corresponds to the threat mitigating implementation.

19. The computer-readable medium of claim 17, wherein the computer-executable instructions for providing for selection of the particular threat further comprise instructions for identifying a desired level of strength of technology with which to mitigate the particular threat.

20. The computer-readable medium of claim 17, wherein the computer-executable instructions for providing for selection of the particular threat further comprise instructions for presenting information associated with a particular technology with which to mitigate the one or more security threats in a physical implementation of the application.

21. A device comprising:
a memory comprising computer-executable instructions for providing application security threat-modeling;
a processor that is operatively coupled to the memory, the processor being configured to fetch and execute the computer-executable instructions from the memory, the computer-executable instructions comprising instructions for:
providing class definitions defining attributes of model components representing respective elements of an application, at least one attribute of the attributes associated with a model component specifying a set of security threats applicable to the model component, the model components being selected in response to a first user input;
presenting symbols associated with at least a subset of the model components on a display;
interconnecting respective ones of the at least a subset to form a logical model of the application;
responsive to a second user input, selecting a particular component of the subset;
analyzing the at least a subset of the model components to identify model components of the subset having a security threat associated with a similar security threat category as one of the security threats associated with the particular component; and
changing a manner in which the components are displayed to a user in response to the selection of the particular component and the analysis.

22. The device of claim 21, wherein the model components comprise a module, a port, a store, or a wire.

23. The device of claim 21, wherein the security threats comprise at least one subset of authentication, authorization, auditing, privacy, integrity, availability, and non-repudiation.

24. The device of claim 21, wherein the computer-executable instructions for providing further comprise instructions for determining the security threats for a component of the model components based on functionality of the component in the application.

25. The device of claim 21, wherein the security threats associated with the particular component are potential security threats.

26. The device of claim 21, wherein at least one security threats associated with the particular component is a countered security threat.

27. The device of claim 21, wherein the instructions for analyzing further comprise instructions for providing for selection of a particular threat to indicate that the particular threat requires a threat mitigating implementation in the particular component, the particular threat corresponding to the particular component.

28. The device of claim 27, wherein the computer-executable instructions for providing for selection of the particular threat further comprise instructions for identifying a priority that corresponds to the threat mitigating implementation.

29. The device of claim 27, wherein the computer-executable instructions for providing for selection of the particular threat further comprise instructions for identifying a desired level of strength of technology with which to mitigate the particular threat.

30. The device of claim 27, wherein the computer-executable instructions for providing for selection of the particular threat further comprise instructions for presenting information associated with a particular technology with which to miff gate the one or more security threats in a physical implementation of the application.

31. A computing device comprising:
processing means for presenting a user interface for application security threat-modeling, the processing means comprising:
means for displaying and interconnecting a plurality of model components to design a logical model of an application, at least a subset of the model components comprising a corresponding set of security threat characteristics defined in a schema of class definitions for the model components;
means for specifying a component of the model components in the logical model;
means for analyzing the at least a subset of the model components to identify model components of the subset having a security threat associated with a similar security threat category as one of the security threats associated with the specified component;
means for changing a manner in which the components are displayed in response to the specification of the particular component; and
means for selecting a particular solution to mitigate the security threats in the logical model.

32. The computing device of claim 31, wherein the corresponding security threat characteristics comprise at least one subset of authentication, authorization, auditing, privacy, integrity, availability, and non-repudiation.

33. The computing device of claim 31, wherein the processing means further comprise means for selecting a priority that corresponds to the potential security threats.

34. The computing device of claim 31, wherein the means for selecting further comprise means for specifying a desired level of strength of technology with which to mitigate the security threats.

35. The computing device of claim 31, wherein the processing means further comprise means for selecting a particular technology with which to mitigate the potential security threats in a physical implementation of the application.

36. The method of claim 6, further comprising:
determining that the countered security threat neutralizes one of the security threats associated with a model component other than the particular component; and
revising the set of potential security threats associated with at least one of model components other than the particular component by removing the neutralized security threat from the set.

37. The method of claim 36, further comprising automatically generating computer code configured to prevent the countered security threat.

38. The method of claim 16, further comprising instructions for:
 determining that the countered security threat neutralizes one of the security threats associated with a model component other than the particular component; and
 revising the set of security threats associated with at least one of model components other than the particular component by removing the neutralized security threat from the set.

39. The method of claim 38, further comprising instructions for automatically generating computer code configured to prevent the countered security threat.

40. The method of claim 26, wherein the computer-executable instructions further comprise instructions for:
 determining that the countered security threat neutralizes one of the security threats associated with a model component other than the particular component; and
 revising the set of security threats associated with at least one of model components other than the particular component by removing the neutralized security threat from the set.

41. The method of claim 40, wherein the computer-executable instructions further comprise instructions for automatically generating computer code configured to prevent the countered security threat.

* * * * *